United States Patent
Taguchi

(10) Patent No.: US 12,488,686 B2
(45) Date of Patent: Dec. 2, 2025

(54) CONTROL METHOD, SERVER DEVICE, NON-TRANSITORY COMPUTER READABLE STORAGE MEDIUM, AND DATA DELIVERY SYSTEM

(71) Applicant: Panasonic Intellectual Property Corporation of America, Torrance, CA (US)

(72) Inventor: Masahiro Taguchi, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 76 days.

(21) Appl. No.: 18/521,184

(22) Filed: Nov. 28, 2023

(65) Prior Publication Data

US 2024/0096216 A1 Mar. 21, 2024

Related U.S. Application Data

(63) Continuation of application No. PCT/JP2022/018591, filed on Apr. 22, 2022.

(30) Foreign Application Priority Data

Jun. 3, 2021 (JP) .................. 2021-093828

(51) Int. Cl.
*G08G 1/123* (2006.01)
*G06Q 50/40* (2024.01)

(52) U.S. Cl.
CPC ............ *G08G 1/123* (2013.01); *G06Q 50/40* (2024.01)

(58) Field of Classification Search
None
See application file for complete search history.

(56) References Cited

U.S. PATENT DOCUMENTS

| | | | |
|---|---|---|---|
| 11,402,707 B2* | 8/2022 | Yasui | G02F 1/13363 |
| 11,936,525 B2* | 3/2024 | Kunz | H04W 4/40 |
| 2014/0139354 A1 | 5/2014 | Miyazaki | |

(Continued)

FOREIGN PATENT DOCUMENTS

| JP | 2006-060635 | | 3/2006 |
|---|---|---|---|
| JP | 2006060635 A | * | 3/2006 |

(Continued)

OTHER PUBLICATIONS

International Search Report issued in International Patent Application No. PCT/JP2022/018591, dated Jul. 26, 2022, along with an English translation thereof.

*Primary Examiner* — Fekadeselassie Girma
(74) *Attorney, Agent, or Firm* — Greenblum & Bernstein, P.L.C.

(57) ABSTRACT

A control method including, by a computer: acquiring schedule information indicating movement plans of a plurality of mobile bodies capable of short-range wireless communication with each other, when detecting that state information indicating a current state of a first mobile body among the plurality of mobile bodies is unable to be received from the first mobile body, searching for a second mobile body planned to move to a first area where the first mobile body is staying based on the schedule information; and transmitting delivery data for the first mobile body to the second mobile body.

11 Claims, 9 Drawing Sheets

(56) References Cited

U.S. PATENT DOCUMENTS

| | | | |
|---|---|---|---|
| 2020/0186980 A1 | 6/2020 | Furuyama et al. | |
| 2021/0201682 A1* | 7/2021 | Oyama | G08G 1/0112 |
| 2021/0278241 A1* | 9/2021 | Igarashi | G01C 21/3815 |
| 2022/0028255 A1* | 1/2022 | Fukumori | G06Q 30/0246 |
| 2023/0252399 A1* | 8/2023 | Khoche | G06Q 10/0833 |
| | | | 705/333 |
| 2024/0303558 A1* | 9/2024 | Akashi | G06Q 10/047 |

FOREIGN PATENT DOCUMENTS

| | | | | |
|---|---|---|---|---|
| JP | 2013-037676 | | 2/2013 | |
| JP | 2019-041179 | | 3/2019 | |
| JP | 2019041179 A | * | 3/2019 | H04W 4/40 |
| WO | WO-2023192176 A2 | * | 10/2023 | G01S 5/0226 |

\* cited by examiner

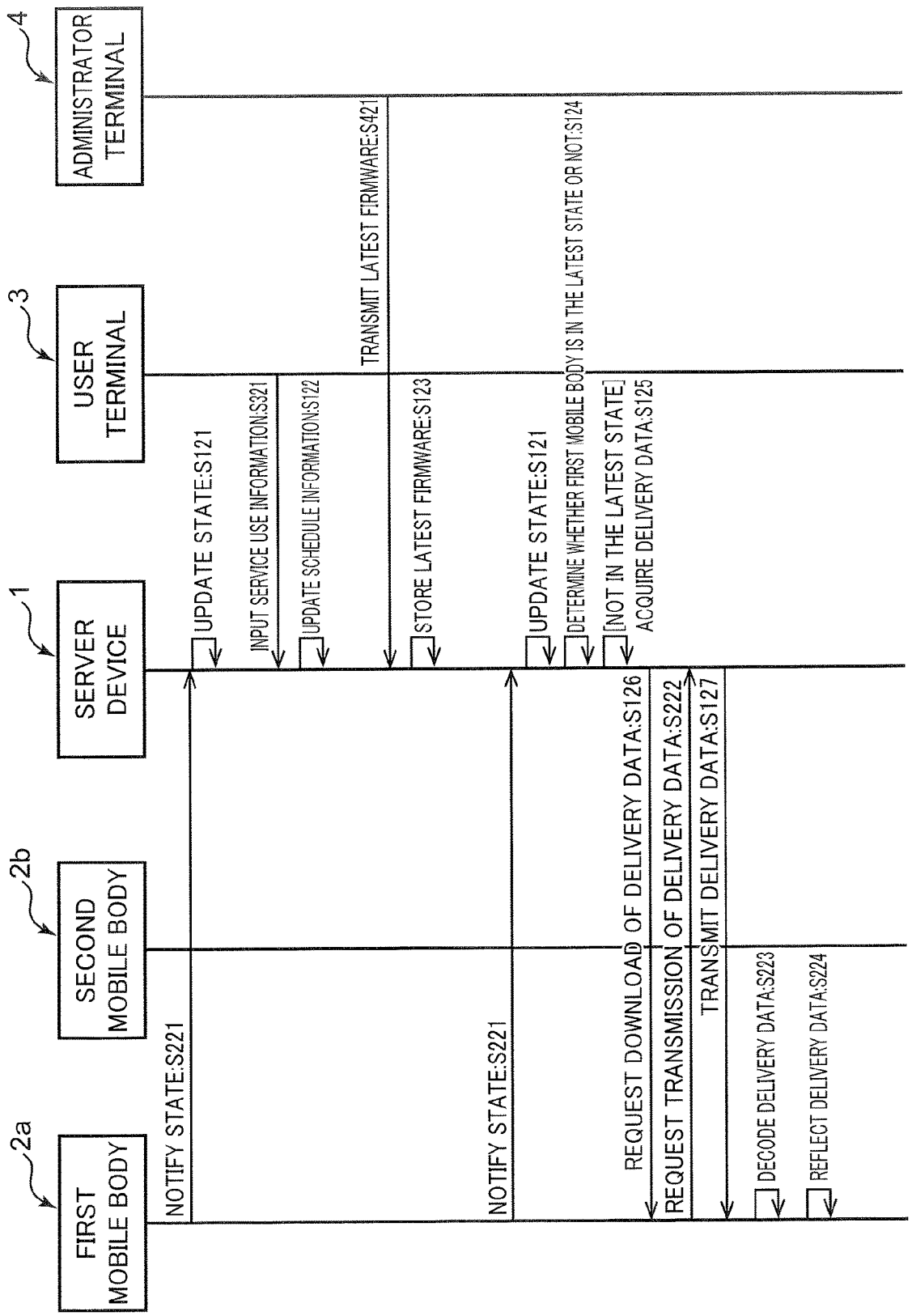

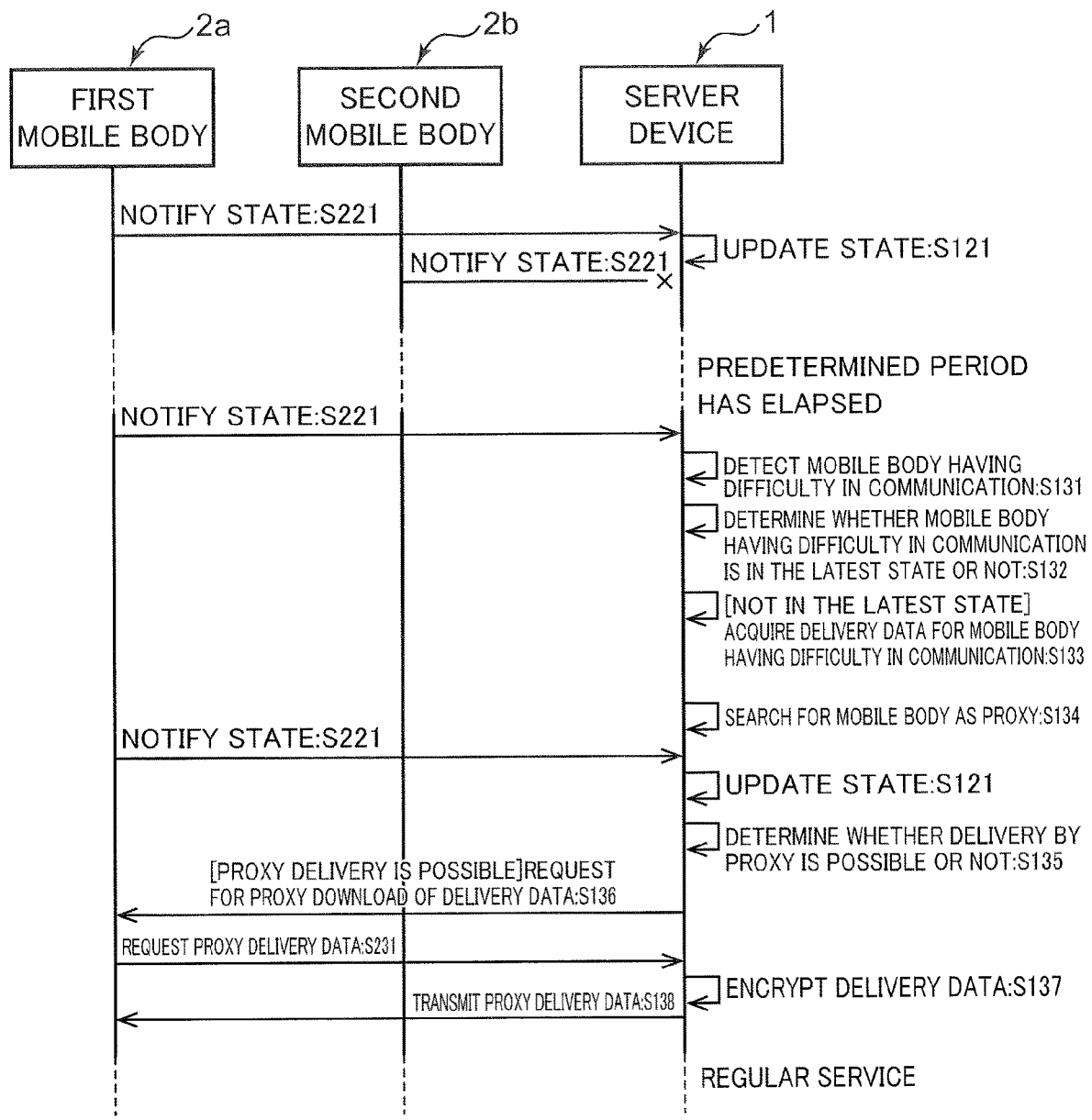

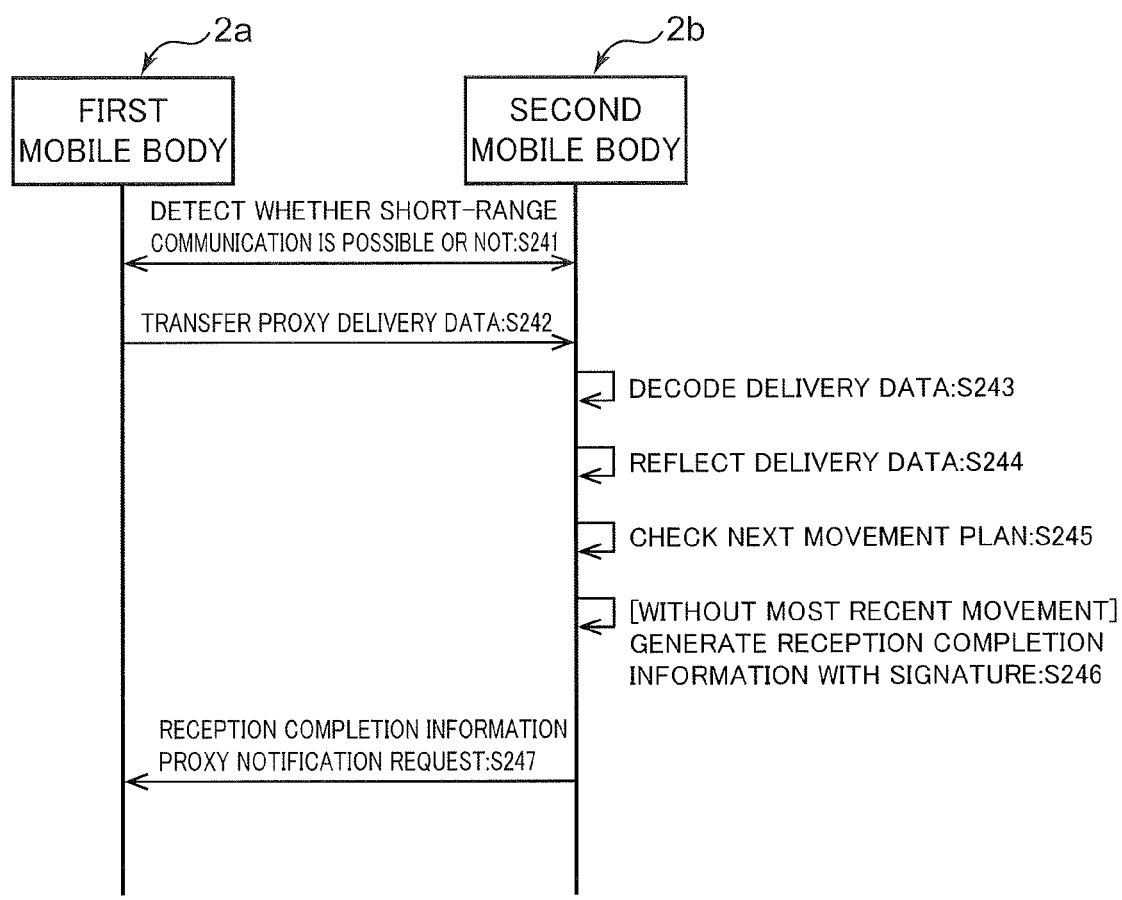

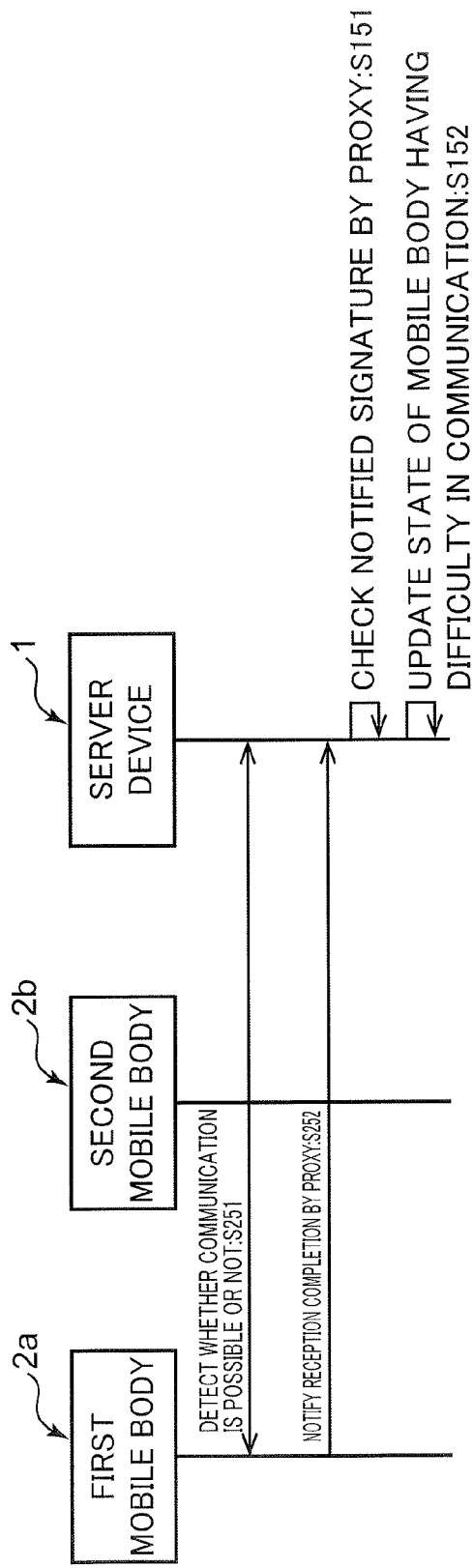

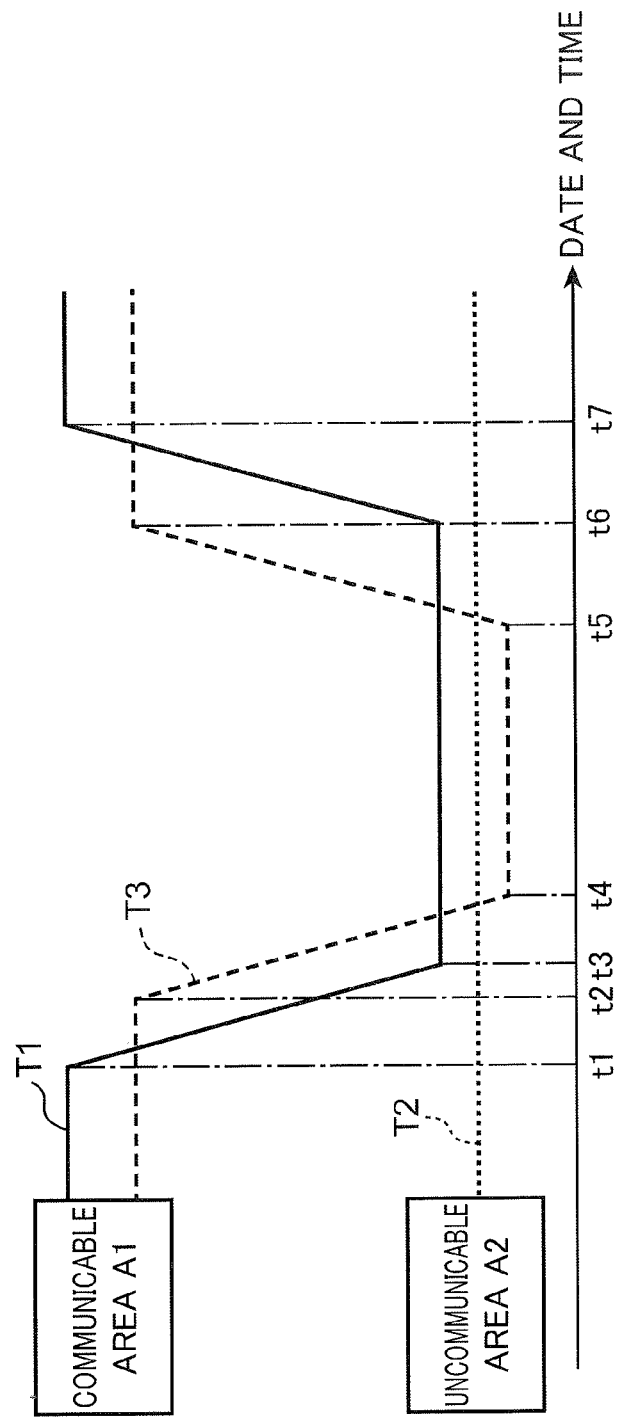

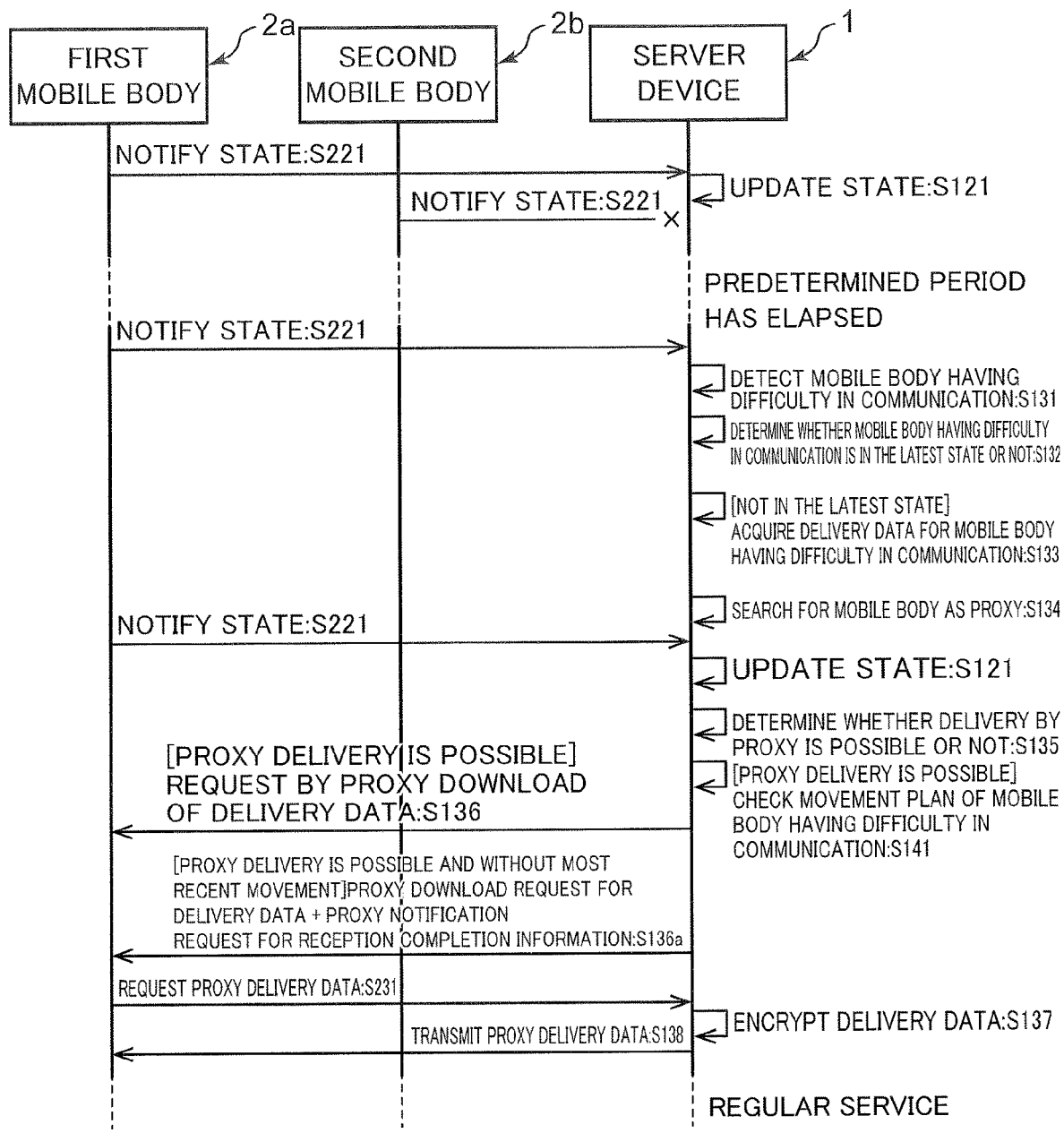

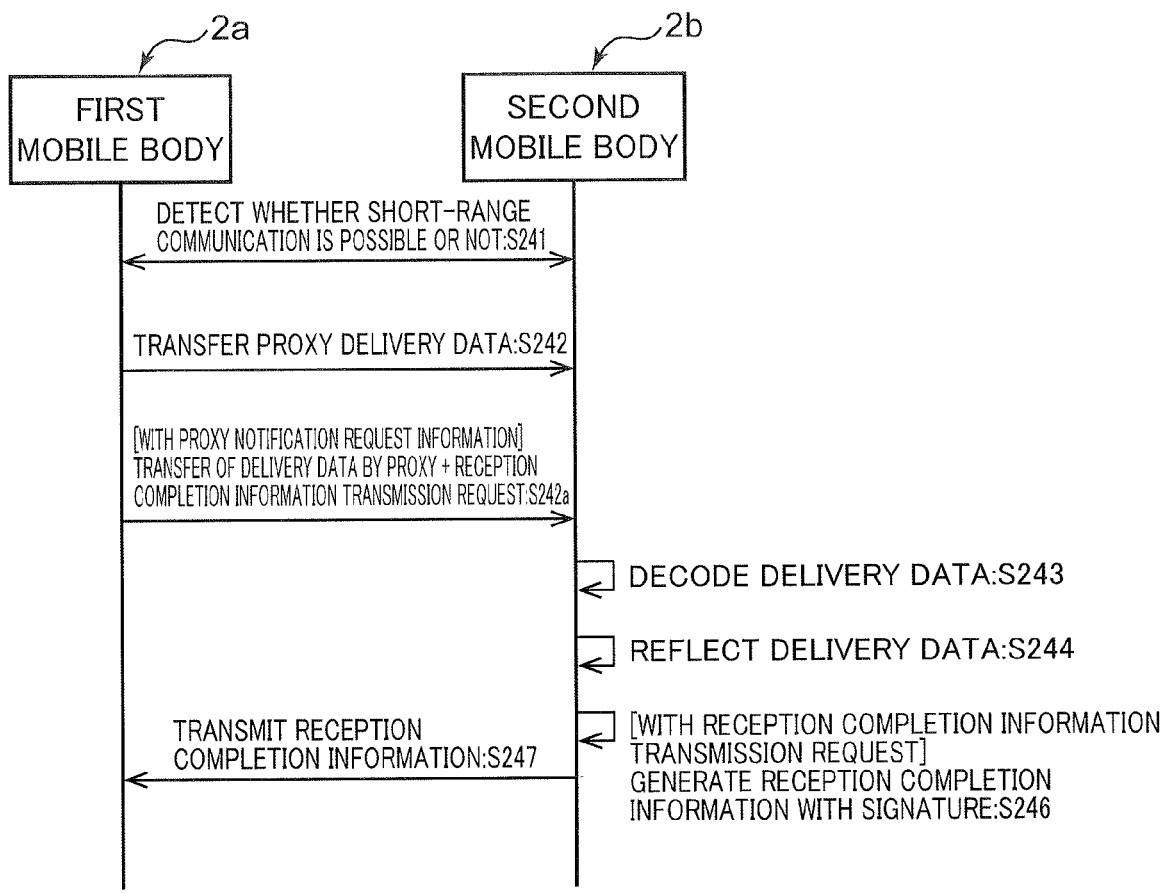

CONTROL METHOD, SERVER DEVICE, NON-TRANSITORY COMPUTER READABLE STORAGE MEDIUM, AND DATA DELIVERY SYSTEM

TECHNICAL FIELD

The present disclosure relates to a technique for delivering data to a plurality of mobile bodies.

BACKGROUND ART

Conventionally, in sharing service of sharing a plurality of mobile bodies, it is known to perform wireless communication between a plurality of mobile bodies and a server device. For example, it is known that information indicating a current state of each mobile body is transmitted to a server device, and the state of each mobile body is managed in the server device. However, there is a case where wireless communication cannot be performed between the mobile body and the server device, for example, when the mobile body moves to a place with a poor radio wave condition.

For this reason, Patent Literature 1 proposes that when a vehicle is out of a range of communication with a server, vehicle information indicating a current state of the own vehicle is transmitted to other vehicle in the vicinity by vehicle-to-vehicle communication, and vehicle information of that other vehicle is received from that other vehicle. Then, when the vehicle moves into the range of communication with the server, it is proposed to transmit the vehicle information of the vehicle and the vehicle information of that other vehicle received outside the communication range to the server.

However, the technique of Patent Literature 1 has a problem that delivery data for other vehicle outside the range of communication with the server cannot be delivered to that other vehicle.

CITATION LIST

Patent Literature

Patent Literature 1: JP 2013-37676 A

SUMMARY OF INVENTION

The present disclosure has been made to solve the above problem, and an object of the present disclosure is to provide a control method, a server device, a non-transitory computer readable storage medium, and a data delivery system that enable delivery of delivery data for a mobile body in a state of being incapable of wireless communication.

A control method according to one aspect of the present disclosure includes, by a computer: acquiring schedule information indicating movement plans of a plurality of mobile bodies capable of short-range wireless communication with each other; when detecting that state information indicating a current state of a first mobile body among the plurality of mobile bodies is unable to be received from the first mobile body, searching for a second mobile body planned to move to a first area where the first mobile body is staying based on the schedule information; and transmitting delivery data for the first mobile body to the second mobile body.

BRIEF DESCRIPTION OF DRAWINGS

FIG. 3 is a sequence diagram illustrating an example of processing of the data delivery system when a user uses the first mobile body in a communicable state with the server device.

FIG. 4 is a sequence diagram illustrating an example of processing of the data delivery system at the time of transmitting delivery data for a second mobile body outside a communication range to the first mobile body as a proxy.

FIG. 5 is a sequence diagram illustrating an example of processing of the data delivery system to be executed when the first mobile body transfers the delivery data for the second mobile body to the second mobile body.

FIG. 6 is a sequence diagram illustrating an example of processing of the data delivery system to be executed when the first mobile body transfers information indicating completion of reception of delivery data to the server device.

FIG. 7 is a diagram illustrating a movement plan of each of three mobile bodies.

FIG. 8 is a sequence diagram illustrating another example of the processing of the data delivery system executed at the time of transmitting the delivery data for the second mobile body outside the communication range to the first mobile body as a proxy.

FIG. 9 is a sequence diagram illustrating another example of the processing of the data delivery system to be executed when the first mobile body transfers the delivery data for the second mobile body to the second mobile body.

DESCRIPTION OF EMBODIMENT

Background to Present Disclosure

Figure 1:
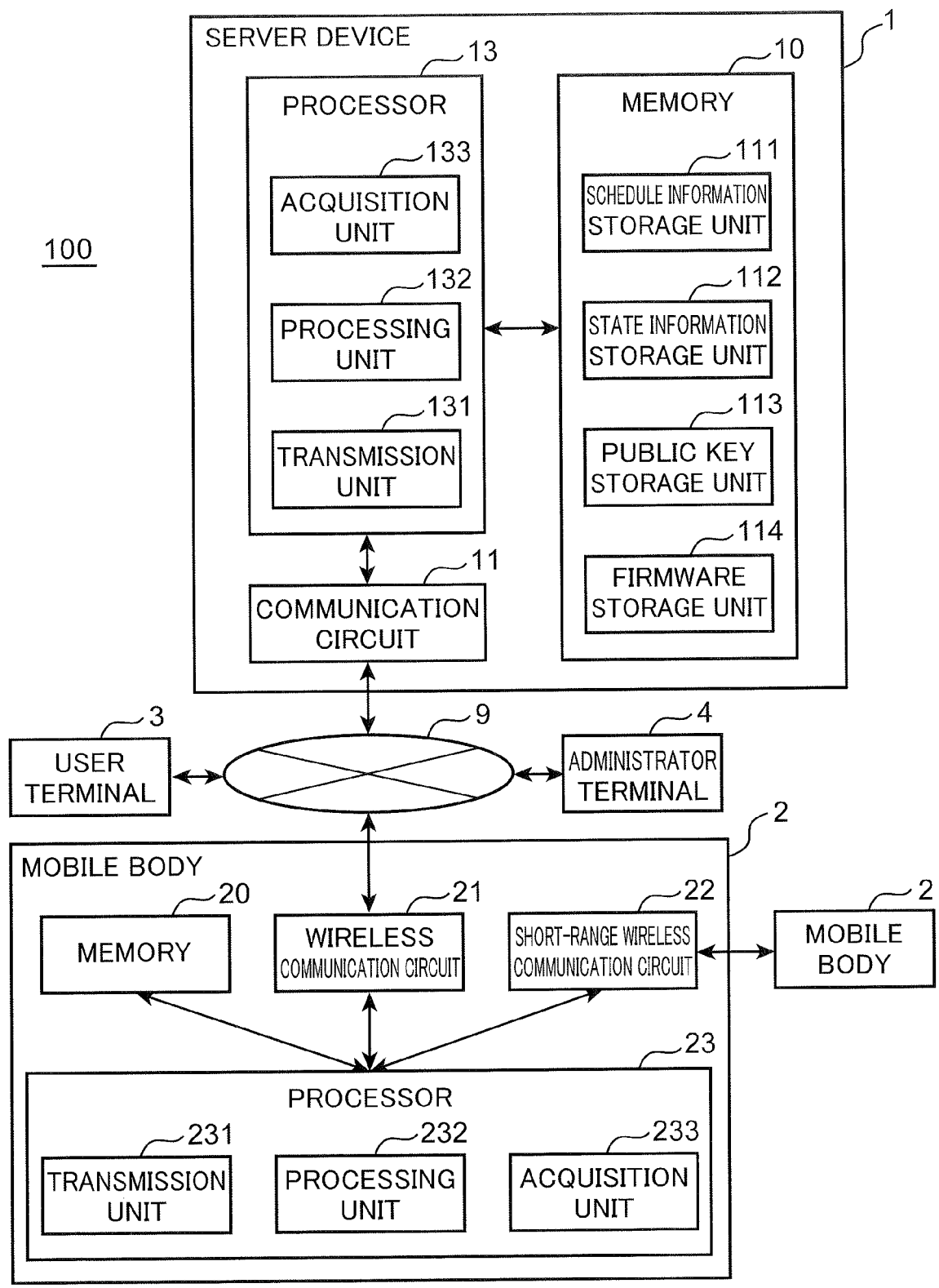
FIG. 1 is a diagram illustrating an example of an overall configuration of a data delivery system.

As described above, it is conventionally known to perform wireless communication between a plurality of mobile bodies and a server device in sharing service of sharing a plurality of mobile bodies. For example, as described in Patent Literature 1, it is known that vehicle information indicating a state of each vehicle is transmitted to a server device, and the state of each vehicle is managed in the server device. Meanwhile, it is known that delivery data including information regarding use of each mobile body by a user and information unique to each mobile body such as firmware is transmitted from a server device to each mobile body.

However, there is a case where wireless communication cannot be performed between the mobile body and the server device, for example, when the mobile body moves to a place with a poor radio wave condition. Therefore, as described above, Patent Literature 1 proposes a method of transmitting vehicle information of other vehicle outside a range of communication with a server to the server. This method, however, has a problem that delivery data including information unique to that other vehicle outside the range of communication with the server cannot be delivered to that other vehicle.

Therefore, the present inventor has intensively studied a technique of delivering delivery data for a mobile body in a state of being incapable of wireless communication to the mobile body, and has reached each aspect of the present disclosure described below.

A control method according to one aspect of the present disclosure includes, by a computer: acquiring schedule information indicating movement plans of a plurality of mobile bodies capable of short-range wireless communication with each other; when detecting that state information indicating a current state of a first mobile body among the plurality of mobile bodies is unable to be received from the first mobile body, searching for a second mobile body planned to move to a first area where the first mobile body is staying based on the schedule information; and transmitting delivery data for the first mobile body to the second mobile body.

According to the present configuration, the second mobile body planned to move to the first area where the first mobile body is staying is searched for as a transmission destination of the delivery data for the first mobile body in the state of being incapable of receiving the state information based on the schedule information. Then, the delivery data is transmitted to the second mobile body. Therefore, when moving to the first area, the second mobile body can deliver the delivery data for the first mobile body to the first mobile body by short-range wireless communication.

In the above-described control method, the schedule information may include information indicating an area from which and a date and time when the plurality of mobile bodies are planned to depart, and information indicating an area at which and a date and time when the plurality of mobile bodies are planned to arrive.

According to the present configuration, it is possible to grasp an area at which the first mobile body has arrived at the most recent past date and time as the first area in which the first mobile body is staying, with reference to the schedule information. In addition, it is possible to appropriately search for, as the second mobile body planned to move to the first area, a mobile body planned to arrive at the first area at a date and time after a date and time when the first mobile body has arrived at the first area and before a date and time when the first mobile body is planned to depart most recently with reference to the schedule information.

In the above-described control method, the delivery data is data that brings the first mobile body into a latest state, and the transmission of the delivery data may include transmitting the delivery data to the second mobile body when it is detected that the state information received most recently from the first mobile body fails to indicate a latest state of the first mobile body.

According to this configuration, when the first mobile body is not in the latest state, the delivery data for bringing the first mobile body into the latest state can be transmitted to the first mobile body via the second mobile body.

In the above-described control method, the transmission of the delivery data may further include transmitting, to the second mobile body, information requesting transfer of the delivery data to the first mobile body.

According to this configuration, it is possible to cause the second mobile body to transfer the delivery data for the first mobile body to the first mobile body without manual assistance.

In the above-described control method, the transmission of the delivery data may further include: when it is detected that the first mobile body stays in the first area for a predetermined time or more based on the schedule information, further transmitting, to the second mobile body, information requesting to receive information indicating completion of reception of the delivery data from the first mobile body and transfer the information to the computer.

According to this configuration, it is possible to cause the second mobile body to transfer the delivery data for the first mobile body to the first mobile body without manual assistance. In addition, even when the first mobile body is in a state of having difficulty in communication for a predetermined time or more, it is possible to cause the second mobile body to receive the information indicating completion of reception of the delivery data from the first mobile body and transfer the information to the computer. Therefore, the computer can grasp that the delivery data has been delivered to the first mobile body even in a state where communication with the first mobile body is difficult.

In the above-described control method, the search for the second mobile body may include: calculating a required time required to complete transfer of the delivery data to the first mobile body based on a speed of communication with the first mobile body by the short-range wireless communication and on a data amount of the delivery data; and searching for one or more mobile bodies whose stay times in the first area are longer than the required time as the second mobile body based on the schedule information.

In this configuration, one or more mobile bodies planned to stay in the first area for a time longer than the required time required to complete the transfer of the delivery data to the first mobile body by the short-range wireless communication are searched for as the second mobile body. Therefore, while staying in the first area, the second mobile body can deliver the delivery data for the first mobile body to the first mobile body by the short-range wireless communication.

In the above-described control method, the search for the second mobile body may include: when two or more mobile bodies whose stay times in the first area are longer than the required time are detected based on the schedule information, searching for, as the second mobile body, a mobile body that first moves from the first area to a second area different from the first area among the two or more mobile bodies based on the schedule information.

In this configuration, among two or more mobile bodies planned to stay in the first area for a time longer than the required time required to complete the transfer of the delivery data to the first mobile body by the short-range wireless communication, a mobile body that departs from the first area firstest is searched for as the second mobile body.

Therefore, for example, when receiving the information indicating the completion of the reception of the delivery data from the first mobile body after transmitting the delivery data to the first mobile body, the second mobile body can immediately transmit the information indicating the completion of the reception to the computer. In this case, the computer can immediately grasp that the first mobile body is in a state of having received the delivery data.

In the above-described control method, the search for the second mobile body may include: calculating a required time required to complete transfer of the delivery data to the first mobile body based on a speed of communication with the first mobile body by the short-range wireless communication and on a data amount of the delivery data; and searching for two or more mobile bodies whose stay times in the first area are shorter than the required time as the second mobile body based on the schedule information, and the transmission of the delivery data may include: dividing the delivery data into a plurality of pieces of data equal to or less than a total number of the second mobile bodies, and transmitting the plurality of pieces of data to the mobile bodies equal to or less than the total number included in the second mobile bodies so as not to overlap each other.

According to this configuration, two or more mobile bodies planned to stay in the first area for a time shorter than the required time required to complete the transfer of the delivery data to the first mobile body by the short-range wireless communication are searched for as the second mobile body. Further, the delivery data is divided into a plurality of pieces of data equal to or less than the total number of mobile bodies included in the second mobile bodies, and the plurality of pieces of data are transmitted to the mobile bodies equal to or less than the total number included in the second mobile bodies so as not to overlap each other.

Therefore, the mobile bodies equal to or less than the total number can transmit each of the plurality of pieces of data to the first mobile body by the short-range wireless communication. As a result, the first mobile body can acquire the delivery data by combining the plurality of pieces of data received from the mobile bodies equal to or less than the total number.

A server device according to another aspect of the present disclosure includes: an acquisition unit that acquires schedule information indicating movement plans of a plurality of mobile bodies capable of short-range wireless communication with each other; a processing unit that, when detecting that state information indicating a current state of a first mobile body among the plurality of mobile bodies is unable to be received from the first mobile body, searches for a second mobile body planned to move to a first area where the first mobile body is staying based on the schedule information; and a transmission unit that transmits delivery data for the first mobile body to the second mobile body.

The present configuration enables effects similar to those of the control method described above to be acquired.

A non-transitory computer readable storage medium according to yet another aspect of the present disclosure is a non-transitory computer readable storage medium storing a program causes a computer to function as: an acquisition unit that acquires schedule information indicating movement plans of a plurality of mobile bodies capable of short-range wireless communication with each other; a processing unit that, when detecting that state information indicating a current state of a first mobile body among the plurality of mobile bodies is unable to be received from the first mobile body, searches for a second mobile body planned to move to a first area where the first mobile body is staying based on the schedule information; and a transmission unit that transmits delivery data for the first mobile body to the second mobile body.

The present configuration enables effects similar to those of the control method described above to be acquired. In the present disclosure, it is needless to say that such a computer program can be delivered using a computer-readable non-transitory recording medium such as a CD-ROM, or via a communication network such as the Internet.

A data delivery system according to still another aspect of the present disclosure is a data delivery system that transmits data from a server device to a plurality of mobile bodies, in which each of the plurality of mobile bodies includes: a state notification unit that transmits state information indicating a current state of the mobile body to the server device; and a short-range wireless communication unit that performs short-range wireless communication with other mobile body, and the server device includes: an acquisition unit that acquires schedule information indicating movement plans of the plurality of mobile bodies; a processing unit that, when detecting that the state information is unable to be received from a first mobile body among the plurality of mobile bodies, searches for a second mobile body planned to move to a first area where the first mobile body is staying based on the schedule information; and a transmission unit that transmits delivery data for the first mobile body to the second mobile body.

According to the present configuration, in the server device, when the state information cannot be received from the first mobile body, the second mobile body planned to move to the first area where the first mobile body is staying is searched for as a transmission destination of the delivery data for the first mobile body based on the schedule information. Then, the delivery data is transmitted to the second mobile body. Therefore, when moving to the first area, the second mobile body can deliver the delivery data for the first mobile body to the first mobile body by a short-range wireless communication unit.

Each of embodiments described below illustrates a specific example of the present disclosure. Numerical values, shapes, components, steps, order of steps, and the like shown in the embodiments below are merely examples, and are not intended to limit the present disclosure. Furthermore, among components in the embodiments below, a component that is not described in an independent claim indicating a most significant concept will be described as an optional component. In all the embodiments, respective contents can be combined.

In the following, embodiments of the present disclosure will be described with reference to the drawings.

(Embodiments)

FIG. 1 is a diagram illustrating an example of an overall configuration of a data delivery system 100. The data delivery system 100 according to an embodiment of the present disclosure includes a plurality of mobile bodies 2 capable of short-range wireless communication such as Bluetooth (registered trademark) with each other, a server device 1 for a provider of sharing service that shares the plurality of mobile bodies 2 to provide the service, a user terminal 3 for use by a user of the sharing service, and an administrator terminal 4 for use by an administrator of the sharing service.

The mobile body 2, the user terminal 3, and the administrator terminal 4 are communicably connected to the server device 1 via a network 9. The network 9 is configured by, for example, a wide area network (WAN) including the Internet, a mobile phone communication network, and the like.

As the mobile body 2, for example, a vehicle is employed that can be moved by driving by a user, such as an automobile, a motorcycle, a motorized bicycle, or an electric bicycle. As the user terminal 3 and the administrator terminal 4, an information processing device is employed that is capable of communicating with an external device via the network 9 such as a smartphone, a tablet terminal, or a personal computer. As the server device 1, a cloud server is employed that includes one or more computers having a processor such as a central processing unit (CPU), a memory, and a communication circuit that communicates with an external device via the network 9.

In the data delivery system 100, delivery data for each mobile body 2 is delivered from the server device 1 to each mobile body 2 via the network 9, the delivery data being generated based on information and data acquired by the server device 1 from the user terminal 3 and the administrator terminal 4 via the network 9. In addition, in the data delivery system 100, delivery data for a mobile body 2 being incapable of wireless communication with the server device 1 is delivered to the mobile body 2 being incapable of wireless communication via other mobile body 2 as a proxy.

In the following, a detailed configuration of each of the mobile body 2 and the server device 1 will be described.

The mobile body 2 includes a memory 20, a wireless communication circuit 21, a short-range wireless communication circuit 22, and a processor 23. The mobile body 2 further includes a battery for driving the mobile body 2, a global positioning system (GPS) sensor for detecting a current position, an operation device for causing a user to perform various types of operations for using the mobile body 2, and a display for displaying various types of information.

The memory 20 is configured by, for example, a nonvolatile rewritable semiconductor memory such as a flash memory. The memory 20 stores a program to be executed by the processor 23 such as firmware, and data of a secret key and a public key of the mobile body 2. The memory 20 also stores schedule information indicating a movement plan of the mobile body 2.

Specifically, the schedule information includes information indicating a date and time when the schedule information has been generated (hereinafter, generation date and time information), identification information of the mobile body 2, and information regarding a user who uses the mobile body 2 (hereinafter, user information). The schedule information includes information indicating an area from which and a date and time when the mobile body 2 is planned to depart and information indicating an area at which and a date and time when the mobile body 2 is planned to arrive. The area is a service providing base of the sharing service. In the area, a predetermined number of mobile bodies 2 that can be shared in the sharing service are provided and returned. The user information includes identification information of the user, information indicating a name and a contact address of the user, an authentication code for unlocking the mobile body 2 used by the user, and the like.

The wireless communication circuit 21 performs wireless communication with the server device 1 via the network 9. The short-range wireless communication circuit 22 performs short-range wireless communication with other mobile body 2.

The processor 23 is configured by a central processing unit (CPU). The processor 23 includes a transmission unit 231 (a state notification unit, a short-range wireless communication unit), a processing unit 232, and an acquisition unit 233. These blocks may be configured by a dedicated hardware circuit.

The transmission unit 231 transmits various types of information and data to the server device 1 using the wireless communication circuit 21. Specifically, the transmission unit 231 transmits data of the public key stored in the memory 20 to the server device 1. In addition, the transmission unit 231 periodically (e.g., every 30 seconds) transmits state information indicating a current state of the mobile body 2 to the server device 1.

The state information includes information indicating a current date and time (hereinafter, current date and time information), the identification information of the mobile body 2, information indicating a type of the mobile body 2, and information indicating a current position of the mobile body 2. The information indicating the type of the mobile body 2 includes information indicating whether the mobile body 2 is an automobile, a motorcycle, a motorized bicycle, or an electric bicycle, and information indicating a model number (type number) of the mobile body 2. The state information further includes information indicating a date and time when the schedule information has been stored in the memory 20 (hereinafter, schedule update date and time information) and information indicating a version of the firmware stored in the memory 20 (hereinafter, version information).

The transmission unit 231 transmits various types of information and data to other mobile body 2 existing within a predetermined distance using the short-range wireless communication circuit 22. Specifically, the transmission unit 231 transmits delivery data for other mobile body 2 acquired by the acquisition unit 233 to that other mobile body 2 using the short-range wireless communication circuit 22.

The processing unit 232 performs predetermined processing by using various types of information and data acquired by the acquisition unit 233 and various types of information and data stored in the memory 20. For example, when the acquisition unit 233 acquires the delivery data for its own mobile body, the processing unit 232 decodes the delivery data using the data of the secret key stored in the memory 20. The processing unit 232 stores schedule information and/or firmware included in the decoded delivery data in the memory 20.

The acquisition unit 233 acquires various types of information and data received by the wireless communication circuit 21 from the server device 1. Specifically, the acquisition unit 233 acquires delivery data for its own mobile body or for other mobile body 2 received by the wireless communication circuit 21 from the server device 1.

The acquisition unit 233 acquires various types of information and data received by the short-range wireless communication circuit 22 from other mobile body 2. Specifically, the acquisition unit 233 acquires delivery data received by the short-range wireless communication circuit 22 from other mobile body 2.

The server device 1 includes a memory 10, a communication circuit 11, and a processor 13.

The memory 10 is configured by, for example, a nonvolatile rewritable semiconductor memory such as a flash memory or a hard disk drive (HDD) or the like. The memory 10 stores a program to be executed by the processor 13. In addition, the memory 10 includes a schedule information storage unit 111, a state information storage unit 112, a public key storage unit 113, and a firmware storage unit 114.

The schedule information storage unit 111 stores the schedule information indicating movement plans of the plurality of mobile bodies 2.

The state information storage unit 112 stores information on the plurality of mobile bodies 2 (hereinafter, mobile body information) and state information indicating states of the plurality of mobile bodies 2. The mobile body information includes the identification information of the mobile body 2, destination information for communication of the mobile body 2, the model number (type number) of the mobile body 2, information indicating a moving speed of the mobile body 2, and the like.

The public key storage unit 113 stores data of public keys of the plurality of mobile bodies 2.

The firmware storage unit 114 stores firmware that can be used by the plurality of mobile bodies 2 and information on the firmware (hereinafter, firmware information). The firmware information includes information indicating a version of firmware (hereinafter, version information), information indicating a type of the mobile body 2 allowed to use the firmware, and the like.

The communication circuit 11 communicates with the user terminal 3, the administrator terminal 4, and the plurality of mobile bodies 2 via the network 9.

The processor 13 is configured by a central processing unit (CPU), for example. The processor 13 operates as an acquisition unit 133, a processing unit 132, and a transmission unit 131 by executing the program stored in the memory 10.

The acquisition unit 133 acquires various types of information and data received by the communication circuit 11 from the plurality of mobile bodies 2, the user terminal 3, and the administrator terminal 4.

Specifically, the acquisition unit 133 acquires the data of the public key of each mobile body 2 received by the communication circuit 11 from each mobile body 2. The acquisition unit 133 acquires the state information indicating the current state of each mobile body 2 received by the communication circuit 11 from each mobile body 2.

The acquisition unit 133 acquires service use information received by the communication circuit 11 from the user terminal 3. The service use information is information indicating a use content of the mobile body 2 by the user. The service use information includes information indicating a date and time when the user inputs the service use information, the user information, the identification information of the mobile body 2 to be used by the user, information indicating an area where and a date and time when the use of the mobile body 2 is started (hereinafter, lending information), and information indicating an area where and a date and time when the mobile body 2 is returned (hereinafter, return information).

The acquisition unit 133 acquires the mobile body information received by the communication circuit 11 from the administrator terminal 4. The acquisition unit 133 acquires firmware and firmware information received by the communication circuit 11 from the administrator terminal 4.

The processing unit 132 performs predetermined processing by using various types of information and data acquired by the acquisition unit 133 and various types of information and data stored in the memory 10.

Specifically, the processing unit 132 generates schedule information of each mobile body 2 based on the service use information acquired by the acquisition unit 133, and stores the generated schedule information of each mobile body 2 in the schedule information storage unit 111.

For details, the processing unit 132 generates generation date and time information to be included in the schedule information by the information included in the service use information and indicating the date and time when the user inputs the service use information. The processing unit 132 generates identification information of the mobile body 2 and user information to be included in the schedule information by the identification information of the mobile body 2 and the user information included in the service use information. The processing unit 132 generates information indicating an area from which and a date and time when the mobile body 2 is planned to depart, the information to be included in the schedule information, by the lending information included in the service use information. The processing unit 132 generates information indicating an area to which and a date and time when the mobile body 2 is planned to be returned, the information to be included in the schedule information, by the return information included in the service use information.

The processing unit 132 stores the mobile body information on each mobile body 2 acquired by the acquisition unit 133 in the state information storage unit 112. As a result, each mobile body 2 is registered as a target mobile body 2 to be shared by the sharing service. Every time the acquisition unit 133 acquires the state information of each mobile body 2, the processing unit 132 stores the state information in the state information storage unit 112. As a result, the processing unit 132 updates the state information indicating the current state of each mobile body 2 with the state information of each mobile body 2 most recently stored in the state information storage unit 112.

The processing unit 132 stores the data of the public key of each mobile body 2 acquired by the acquisition unit 133 in the public key storage unit 113. The processing unit 132 stores the firmware and the firmware information acquired by the acquisition unit 133 in the firmware storage unit 114 in association with each other.

The processing unit 132 determines whether each mobile body 2 is in the latest state or not based on the state information indicating the current state of each mobile body 2 stored in the state information storage unit 112 and on the schedule information of each mobile body 2 stored in the schedule information storage unit 111. The state in which each of the mobile bodies 2 is in the latest state represents a state in which each of the mobile bodies 2 has completed reception of delivery data for bringing each of the mobile bodies 2 into the latest state. When determining that each mobile body 2 is not in the latest state, the processing unit 132 acquires the delivery data for bringing each mobile body 2 into the latest state. The delivery data includes a latest version of firmware to be delivered to each mobile body 2 and the schedule information indicating the movement plan of each mobile body 2.

Specifically, the processing unit 132 refers to the state information of each mobile body 2 stored most recently in the state information storage unit 112 as the state information indicating the current state of each mobile body 2. It is assumed that firmware information including the information indicating the type of each mobile body 2 included in the state information, and version information indicating a newer version than the version information included in the state information is stored in the firmware storage unit 114. In this case, the processing unit 132 determines that each mobile body 2 is not in the latest state. Then, the processing unit 132 acquires firmware associated with the firmware information from the firmware storage unit 114 as the delivery data for bringing each mobile body 2 into the latest state.

In addition, when among the schedule information of the respective mobile bodies 2 stored in the schedule information storage unit 111, schedule information is present that includes generation date and time information indicating a date and time newer than the schedule update date and time information included in the above-described referred state information, the processing unit 132 determines that each mobile body 2 is not in the latest state. In this case, the processing unit 132 acquires schedule information including the generation date and time information indicating the above new date and time from the schedule information storage unit 111 as the delivery data for bringing each mobile body 2 into the latest state.

The processing unit 132 encrypts the acquired delivery data for each mobile body 2 using the data of the public key of each mobile body 2 stored in the public key storage unit 113.

When detecting the mobile body 2 in a state of having difficulty in communication with the server device 1, the processing unit 132 searches for a mobile body 2 as a proxy that can transfer delivery data for the mobile body 2 to the mobile body 2 based on the schedule information of the plurality of mobile bodies 2 stored in the schedule information storage unit 11.

The transmission unit 131 transmits various types of information and data to the plurality of mobile bodies 2 using the communication circuit 11. Specifically, the transmission unit 131 transmits the delivery data for each mobile body 2 encrypted by the processing unit 132 to each mobile body 2. Furthermore, in a case where the processing unit 132 searches for a proxy mobile body 2, the transmission unit 131 transmits the delivery data encrypted by the processing unit 132 to the proxy mobile body 2.

Next, processing of the data delivery system 100 will be described with reference to FIGS. 2 to 7.

(Processing of Registering Data of Public Key of Each Mobile Body 2)

Figure 2:
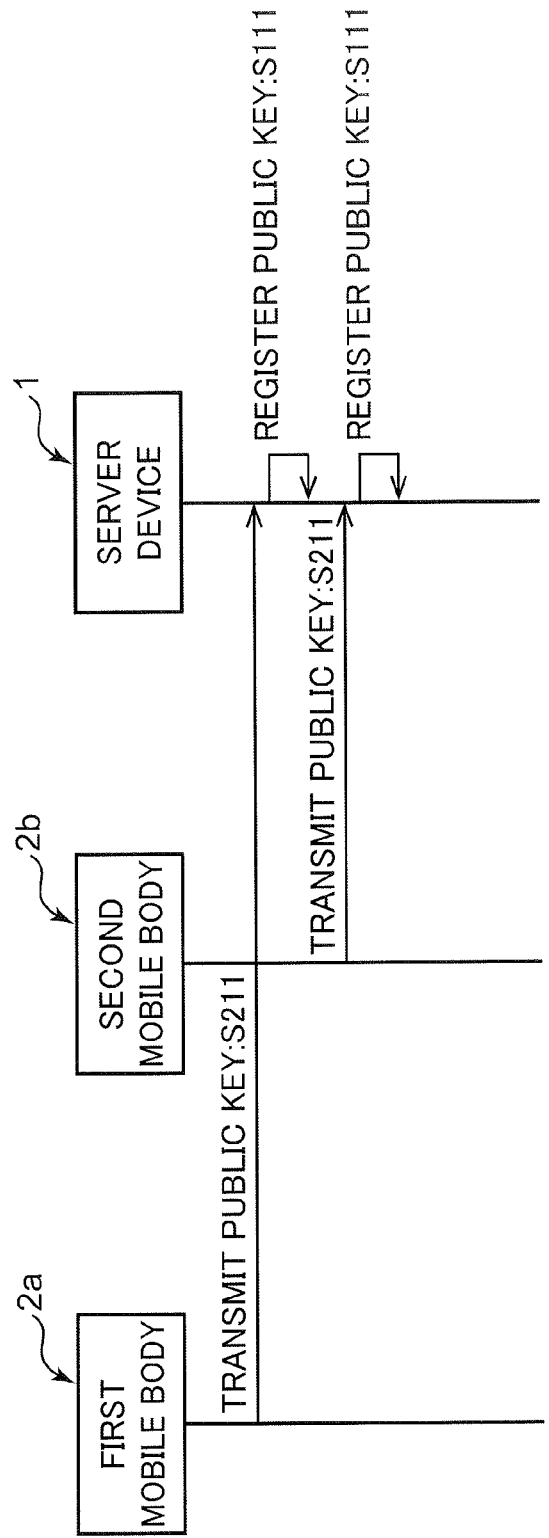
FIG. 2 is a sequence diagram illustrating an example of processing of the data delivery system at the time of registering data of public keys of a first mobile body and a second mobile body in a server device.

First, processing of the data delivery system 100 to be executed when data of public keys of a first mobile body 2a and a second mobile body 2b is registered in the server device 1 will be described with reference to FIG. 2. FIG. 2 is a sequence diagram illustrating an example of the processing of the data delivery system 100 at the time of registering the data of the public keys of the first mobile body 2a and the second mobile body 2b in the server device 1.

After the first mobile body 2a is registered as a target to be shared in the sharing service, as illustrated in FIG. 2, the transmission unit 231 of the first mobile body 2a transmits the data of the public key of the first mobile body 2a stored in the memory 20 to the server device 1 (Step S211).

In the server device 1, the processing unit 132 stores the data of the public key of the first mobile body 2a acquired by the acquisition unit 133 in the public key storage unit 113 (Step S111). As a result, the public key of the first mobile body 2a is registered in the server device 1.

Similarly, the data of the public key of the second mobile body 2b is registered in the server device 1. As a result, in the server device 1, the data to be delivered to each of the first mobile body 2a and the second mobile body 2b can be encrypted using the data of the public keys of the first mobile body 2a and the second mobile body 2b and transmitted.

(Processing Using First Mobile Body 2a)

Next, with reference to FIG. 3, description will be made of processing of the data delivery system 100 when a user uses the first mobile body 2a in a state of being communicable with the server device 1. FIG. 3 is a sequence diagram illustrating an example of the processing of the data delivery system 100 when a user uses the first mobile body 2a in the state of being communicable with the server device 1.

As shown in FIG. 3, the transmission unit 231 of the first mobile body 2a periodically transmits the state information indicating a current state of the first mobile body 2a to the server device 1 (Step S221).

In the server device 1, every time the acquisition unit 133 acquires state information of the first mobile body 2a, the processing unit 132 stores the state information in the state information storage unit 112. As a result, the state information indicating the current state of the first mobile body 2a is updated with state information of the first mobile body 2a most recently stored in the state information storage unit 112 (Step S121).

On the other hand, when receiving input operation of service use information for using the first mobile body 2a by the user, the user terminal 3 transmits the service use information to the server device 1 (Step S321).

In the server device 1, the processing unit 132 generates schedule information of the first mobile body 2a using the service use information for using the first mobile body 2a acquired by the acquisition unit 133, and stores the generated schedule information in the schedule information storage unit 111. As a result, the schedule information of the first mobile body 2a is updated (Step S122).

In addition, upon receiving input operation of the latest version of firmware available in the same type of the mobile body 2 as the first mobile body 2a and firmware information related to the firmware by the administrator, the administrator terminal 4 transmits the firmware and the firmware information to the server device 1 (Step S421).

In the server device 1, the processing unit 132 stores the latest version of firmware and the firmware information related to the firmware which are acquired by the acquisition unit 133 in the firmware storage unit 114 in association with each other (Step S123).

Thereafter, when the use of the first mobile body 2a by the user is started, the transmission unit 231 of the first mobile body 2a periodically transmits the state information indicating the current state of the first mobile body 2a to the server device 1 (Step S221).

In the server device 1, the processing unit 132 stores the state information acquired by the acquisition unit 133 in the state information storage unit 112. This causes the state information indicating the current state of the first mobile body 2a to be updated (Step S121).

The processing unit 132 determines whether the first mobile body 2a is in the latest state or not based on the state information indicating the current state of the first mobile body 2a stored in the state information storage unit 112 and the schedule information of the first mobile body 2a stored in the schedule information storage unit 111 (Step S124).

When determining that the first mobile body 2a is not in the latest state, the processing unit 132 acquires the delivery data for the first mobile body 2a (Step S125). The transmission unit 131 transmits information requesting download of the delivery data to the first mobile body 2a (Step S126).

When the acquisition unit 233 of the first mobile body 2a acquires the information requesting download of the delivery data, the transmission unit 231 transmits information requesting transmission of the delivery data to the server device 1 (Step S222).

When the acquisition unit 133 of the server device 1 acquires the information requesting transmission of the delivery data, the processing unit 132 encrypts the delivery data using the data of the public key of the first mobile body 2a stored in the public key storage unit 113. The transmission unit 131 transmits the encrypted delivery data for the first mobile body 2a to the first mobile body 2a (Step S127).

In the first mobile body 2a, when the acquisition unit 233 acquires the delivery data, the processing unit 232 decodes the delivery data using the data of the secret key of the first mobile body 2a stored in the memory 20 (Step S223). The processing unit 232 reflects the decoded delivery data in the memory 20 (Step S224).

Specifically, in Step S224, when the decoded delivery data includes the schedule information of the first mobile body 2a, the processing unit 232 updates the schedule information stored in the memory 20 with the included schedule information. The transmission unit 231 updates the schedule update date and time information to be included in the state information to be transmitted to the server device 1 to information indicating the date and time when the schedule information has been updated in Step S224.

In addition, in Step S224, in a case where firmware is included in the decoded delivery data, the processing unit 232 updates the firmware stored in the memory 20 with the included firmware. The transmission unit 231 updates the version information to be included in the state information to be transmitted to the server device 1 to information indicating a version of the firmware.

(Processing of Transmitting Delivery Data for Second Mobile Body 2b to First Mobile Body 2a as Proxy)

Next, description will be made of processing of the data delivery system 100 at the time of transmitting delivery data for the second mobile body 2b to the first mobile body 2a as a proxy with a case, as an example, where the first mobile body 2a is in a state of being communicable with the server device 1 while the second mobile body 2b is in a state of being incommunicable with the server device 1. FIG. 4 is a sequence diagram illustrating an example of the processing of the data delivery system 100 at the time of transmitting the delivery data for the second mobile body 2b outside a communication range to the first mobile body 2a as a proxy.

As shown in FIG. 4, the transmission unit 231 of the first mobile body 2a periodically transmits the state information indicating the current state of the first mobile body 2a to the server device 1 (Step S221). In the server device 1, the processing unit 132 stores the state information of the first mobile body 2a acquired by the acquisition unit 133 in the state information storage unit 112. This causes the state information indicating the current state of the first mobile body 2a to be updated (Step S121). Meanwhile, the acquisition unit 133 enters a state of being incapable of acquiring the state information transmitted by the transmission unit 231 of the second mobile body 2b. Therefore, the state information indicating the current state of the second mobile body 2b is not updated.

Meanwhile, the processing unit 132 periodically refers to the state information of the plurality of mobile bodies 2 stored in the state information storage unit 112. In a case where the state information includes the current date and time information indicating a date and time a predetermined period or more before the current date and time, the processing unit 132 detects that the mobile body 2 corresponding to the state information is in a state of having difficulty in communication with the server device 1, and that the state information cannot be received from the mobile body 2 (the first mobile body) (Step S131). In this example, it is assumed that it is detected in Step S131 that the state information cannot be received from the second mobile body 2b.

When detecting that the state information cannot be received from the second mobile body 2b, the processing unit 132 determines whether the second mobile body 2b is in the latest state or not based on the state information indicating the current state of the second mobile body 2b stored in the state information storage unit 112 and the schedule information of the second mobile body 2b stored in the schedule information storage unit 111 (Step S132).

When determining that the second mobile body 2b is not in the latest state, the processing unit 132 acquires the delivery data for the second mobile body 2b (Step S133). Next, the processing unit 132 searches for a mobile body 2 as a proxy that can transfer delivery data for the second mobile body 2b to the second mobile body 2b based on the schedule information of the plurality of mobile bodies 2 stored in the schedule information storage unit 111 (Step S134).

Specifically, in Step S134, the processing unit 132 searches for a mobile body 2 planned to move to an area (a first area) where the second mobile body 2b is currently staying as a proxy mobile body 2 (a second mobile body) based on the schedule information of the plurality of mobile bodies 2 stored in the schedule information storage unit 111.

Specifically, the processing unit 132 refers to the schedule information of the second mobile body 2b stored in the schedule information storage unit 111, and grasps an area where the second mobile body 2b has arrived at the most recent past date and time as an area where the second mobile body 2b is currently staying (hereinafter, uncommunicable area).

The processing unit 132 grasps, as a mobile body 2 planned to move to the uncommunicable area, a mobile body 2 corresponding to the schedule information including the information indicating the date and time when the mobile body 2 is planned to arrive at the uncommunicable area, the date and time being after the date and time when the second mobile body 2b has arrived at the uncommunicable area and before the date and time when the second mobile body 2b is planned to depart most recently. The mobile body 2 corresponding to the schedule information is the mobile body 2 identified by the identification information of the mobile body 2 included in the schedule information.

Note that it is assumed that there exists no schedule information indicating that the second mobile body 2b departs after the current date and time. In this case, the processing unit 132 grasps, as a mobile body 2 planned to move to the uncommunicable area, a mobile body 2 corresponding to the schedule information including the information indicating the date and time when the second mobile body 2b is planned to arrive at the uncommunicable area after the date and time when the second mobile body 2b has arrived at the uncommunicable area.

Furthermore, in a case where there exists a plurality of mobile bodies 2 planned to move to the uncommunicable area, the processing unit 132 searches for a mobile body 2 randomly selected from the plurality of mobile bodies 2 as a proxy mobile body 2. Alternatively, the processing unit 132 may determine a proxy mobile body 2 from among the plurality of mobile bodies 2 by a method to be described later. In this example, it is assumed that the first mobile body 2a has been searched as the proxy mobile body 2 in Step S134.

After Step S134, in the server device 1, when the acquisition unit 133 acquires the state information of the first mobile body 2a, the processing unit 132 updates the state information indicating the current state of the first mobile body 2a (Step S121). Next, the processing unit 132 determines whether or not the delivery data for the second mobile body 2b can be delivered to the first mobile body 2a as a proxy (Step S135).

Specifically, in Step S135, the processing unit 132 refers to information indicating a type of the first mobile body 2a and information indicating a current position of the first mobile body 2a included in the state information of the first mobile body 2a acquired by the acquisition unit 133. The processing unit 132 also refers to a moving speed of the first mobile body 2a included in mobile body information of the first mobile body 2a stored in the state information storage unit 112. The processing unit 132 calculates a time required for the mobile body 2 of the referred type to move from the referred current position to the uncommunicable area grasped in Step S134 at the referred moving speed (hereinafter, moving time).

The processing unit 132 also calculates a total time of time required to encrypt the delivery data acquired in Step S133 at a predetermined encryption speed and a time required from transmission of the encrypted delivery data to the first mobile body 2a at a predetermined communication speed to completion of reception by the first mobile body 2a.

In a case where the calculated moving time is longer than the calculated total time, the processing unit 132 determines that the delivery data for the second mobile body 2b can be delivered to the first mobile body 2a as a proxy.

In a case where the processing unit 132 determines in Step S135 that the delivery data for the second mobile body 2*b* cannot be delivered to the first mobile body 2*a* as a proxy, Step S134 is performed. This enables the proxy mobile body 2 to be searched again.

In a case where it is determined in Step S135 that the delivery data for the second mobile body 2*b* can be delivered to the first mobile body 2*a* as a proxy, the transmission unit 131 transmits, to the first mobile body 2*a*, information requesting transfer of the delivery data for the second mobile body 2*b* to the second mobile body 2*b* (hereinafter, proxy download request information) (Step S136).

When the acquisition unit 233 of the first mobile body 2*a* acquires the proxy download request information, the transmission unit 231 of the first mobile body 2*a* transmits information requesting transmission of the delivery data for the second mobile body 2*b* to the server device 1 (Step S231).

When the acquisition unit 133 of the server device 1 acquires the information requesting transmission of the delivery data for the second mobile body 2*b*, the processing unit 132 encrypts the delivery data for the second mobile body 2*b* acquired in Step S133 using the data of the public key of the second mobile body 2*b* stored in the public key storage unit 113 (Step S137). The transmission unit 131 transmits the delivery data for the second mobile body 2*b* encrypted in Step S137 to the first mobile body 2*a* (Step S138). As a result, the acquisition unit 233 of the first mobile body 2*a* acquires delivery data for the second mobile body 2*b*. Hereafter, processing similar to the processing illustrated in FIG. 3 is performed.

(Processing of Transferring Delivery Data for Second Mobile Body 2*b* to Second Mobile Body 2*b*)

Next, description will be made of processing of the data delivery system 100 when the first mobile body 2*a* moves to an area where the second mobile body 2*b* is currently staying and transfers delivery data for the second mobile body 2*b* to the second mobile body 2*b* with reference to FIG. 5. FIG. 5 is a sequence diagram illustrating an example of the processing of the data delivery system 100 when the first mobile body 2*a* transfers the delivery data for the second mobile body 2*b* to the second mobile body 2*b*.

It is assumed that the first mobile body 2*a* that has acquired the delivery data for the second mobile body 2*b* has arrived at the area where the second mobile body 2*b* is currently staying. At this time, as shown in FIG. 5, the transmission unit 231 of the first mobile body 2*a* detects whether or not short-range communication with the second mobile body 2*b* is possible using the short-range wireless communication circuit 22 (Step S241). When detecting that the short-range communication with the second mobile body 2*b* is possible, the transmission unit 231 of the first mobile body 2*a* transfers the delivery data for the second mobile body 2*b* to the second mobile body 2*b* (Step S242).

In the second mobile body 2*b*, when the acquisition unit 233 acquires the delivery data for the second mobile body 2*b*, the processing unit 232 decodes the delivery data using the data of the secret key of the second mobile body 2*b* stored in the memory 20 (Step S243). Then, as in Step S224 (FIG. 3), the processing unit 232 reflects the decoded delivery data in the memory 20 of the second mobile body 2*b* (Step S244).

Next, the processing unit 232 checks whether or not the second mobile body 2*b* has a most recent movement plan based on the schedule information of the second mobile body 2*b* stored in the memory of the second mobile body 2*b* (Step S245).

Specifically, in Step S245, in a case where there exists schedule information indicating that a planned date and time of departure from the area where the second mobile body 2*b* is currently staying is the current date and time or later, the processing unit 232 grasps a period from the current date and time to the planned date and time of departure as a remaining stay period in the area where the second mobile body 2*b* is currently staying. When the remaining stay period is equal to or longer than a predetermined reference stay period (predetermined time), the processing unit 232 determines that the second mobile body 2*b* has no most recent movement plan. In addition, in a case where there exists no schedule information indicating a plan to depart from the area where the second mobile body 2*b* is currently staying, the processing unit 232 determines that the second mobile body 2*b* has no most recent movement plan.

When determining that the second mobile body 2*b* has no most recent movement plan, the processing unit 232 generates information indicating completion of reception of the delivery data (hereinafter, reception completion information). The reception completion information includes a message indicating completion of reception of the delivery data and state information indicating a state of the second mobile body 2*b* after the delivery data is reflected. The processing unit 232 generates reception completion information with an electronic signature by encrypting the generated reception completion information with the data of the secret key of the second mobile body 2*b* stored in the memory 20 (Step S246).

Note that in a case where the processing unit 232 determines in Step S245 that the second mobile body 2*b* has a most recent movement plan, Step S246 is not performed. The second mobile body 2*b*, however, is planned to move to other area before the reference stay period elapses. Therefore, when the second mobile body 2*b* becomes wirelessly communicable with the server device 1, the transmission unit 231 of the second mobile body 2*b* can transmit, to the server device 1, the state information indicating the state of the second mobile body 2*b* after the delivery data is reflected.

When the reception completion information with the electronic signature is generated, the transmission unit 231 transmits, to the first mobile body 2*a*, the reception completion information and information requesting transfer of the reception completion information (hereinafter, proxy notification request information) to the server device 1 by proxy using the short-range wireless communication circuit 22 (Step S247). As a result, the acquisition unit 233 of the first mobile body 2*a* acquires the reception completion information and the proxy notification request information from the second mobile body 2*b*.

(Processing of Transferring Information Indicating Completion of Reception of Delivery Data to Server Device 1)

Next, description will be made of processing of the data delivery system 100 to be executed when the first mobile body 2*a* departs from the area where the second mobile body 2*b* is currently staying toward other area and the first mobile body 2*a* transfers the information indicating completion of reception of the delivery data to the server device 1 with reference to FIG. 6. FIG. 6 is a sequence diagram illustrating an example of the processing of the data delivery system to be executed when the first mobile body 2*a* transfers the information indicating completion of reception of the delivery data to the server device 1.

It is assumed that the first mobile body 2*a* that has acquired the reception completion information with the electronic signature and the proxy notification request information departs from the area where the second mobile body 2b is currently staying toward other area. At this time, as shown in FIG. 6, the transmission unit 231 of the first mobile body 2a detects whether wireless communication with the server device 1 is possible or not using the wireless communication circuit 21 (Step S251).

Upon detecting that wireless communication with the server device 1 is possible, the transmission unit 231 transmits the reception completion information with the electronic signature acquired by the acquisition unit 233 to the server device 1 (Step S252).

In the server device 1, when the acquisition unit 133 receives the reception completion information with the electronic signature generated by the second mobile body 2b, the processing unit 132 checks whether or not the electronic signature attached to the reception completion information is the electronic signature by the second mobile body 2b (Step S151). Specifically, in Step S151, when the reception completion information received from the first mobile body 2a can be decoded using the data of the public key of the second mobile body 2b stored in the public key storage unit 113, the processing unit 132 determines that the electronic signature attached to the reception completion information is the electronic signature by the second mobile body 2b.

When confirming that the electronic signature attached to the reception completion information is the electronic signature by the second mobile body 2b, the processing unit 132 updates the state information indicating the current state of the second mobile body 2b (Step S152). Specifically, in Step S152, the processing unit 132 stores the state information included in the reception completion information decoded in Step S151 in the state information storage unit 112. As a result, the state information indicating the current state of the second mobile body 2b is updated with state information of the second mobile body 2b most recently stored in the state information storage unit 112.

(Method of Determining Mobile Body 2 as Proxy)

Next, description will be made of a method of determining a proxy mobile body 2, in a case where there exists a plurality of mobile bodies 2 planned to move to an uncommunicable area, from among the plurality of mobile bodies 2 in Step S134 (FIG. 4) with reference to FIG. 7. The following description will be made, as an example, of a case where there exist two mobile bodies 2, the first mobile body 2a and a third mobile body as the mobile bodies 2 planned to move to the uncommunicable area where the second mobile body 2b is currently staying.

FIG. 7 is a diagram illustrating a movement plan of each of the three mobile bodies 2, i.e., the first mobile body 2a, the second mobile body 2b, and the third mobile body. In FIG. 7, the horizontal axis represents date and time. A graph T1 indicates that the first mobile body 2a is planned to depart from a communicable area A1 where communication with the server device 1 is possible at a date and time t1, and arrive at an uncommunicable area A2 where communication with the server device 1 is impossible and where the second mobile body 2b is staying at a date and time t3. Further, the graph T1 indicates that the first mobile body 2a is planned to depart from the area A2 at a date and time t6 and arrive at the area A1 at a date and time t7.

A graph T3 indicates that the third mobile body is planned to depart from the area A1 at a date and time t2 and arrive at the area A2 at a date and time t4. The graph T3 also indicates that the third mobile body is planned to depart from the area A2 at a date and time t5 and arrive at the area A1 at the date and time t6.

A graph 12 indicates that the second mobile body 2b is planned to arrive at the area A2 at a date and time before the date and time t1. The graph T2 also indicates that the second mobile body 2b has no plan to depart from the area A2 at a time after the date and time 7.

In this case, the processing unit 132 calculates a time required for the first mobile body 2a to complete transfer of the delivery data to the second mobile body 2b (hereinafter, first required time) based on a speed of communication with the short-range wireless communication circuit 22 of the second mobile body 2b by the short-range wireless communication circuit 22 of the first mobile body 2a (hereinafter, first communication speed) and a data amount of the delivery data for the second mobile body 2b.

Specifically, the processing unit 132 divides the data amount of the delivery data for the second mobile body 2b by the first communication speed to calculate the first required time. Then, in a case where a stay time from the date and time t3 to the date and time t6 when the first mobile body 2a stays in the area A2 (hereinafter, first stay time) is longer than the first required time, the processing unit 132 determines the first mobile body 2a as a proxy mobile body 2.

Similarly, the processing unit 132 calculates a time required for the third mobile body to complete the transfer of the delivery data to the second mobile body 2b (hereinafter, third required time). Then, in a case where a stay time from the date and time t4 to the date and time t5 when the third mobile body stays in the area A2 (hereinafter, third stay time) is longer than the third required time, the processing unit 132 determines the third mobile body as a proxy mobile body 2.

However, the first stay time may be longer than the first required time, and the third stay time may also be longer than the third required time. In this case, the processing unit 132 detects two or more mobile bodies 2 whose stay times in the area A2 are longer than the required time required to complete the transfer of the delivery data to the second mobile body 2b based on the schedule information of the plurality of mobile bodies 2. In this case, the processing unit 132 determines, as a proxy mobile body 2, a mobile body 2 that first moves from the area A2 to the area A1 different from the area A2 among the two or more mobile bodies 2.

For example, in the example of FIG. 7, it is assumed that the first stay time is longer than the first required time and the third stay time is longer than the third required time. In this case, the processing unit 132 determines, as a proxy mobile body 2, a third mobile body that first moves from the area A2 to the area A1 different from the area A2 among the first mobile body 2a and the third mobile body.

Further, the first stay time may be shorter than the first required time, and the third stay time may also be shorter than the third required time. In this case, the processing unit 132 detects two or more mobile bodies 2 whose stay times in the area A2 are shorter than the required time required to complete the transfer of the delivery data to the second mobile body 2b based on the schedule information of the plurality of mobile bodies 2.

In this case, the processing unit 132 may determine all the two or more mobile bodies 2 as a proxy mobile body 2. In this case, in Step S137 (FIG. 4), the processing unit 132 need only divide the delivery data for the second mobile body 2b into a plurality of pieces of data equal to or less than a total number of the two or more proxy mobile bodies 2, and encrypt each of the plurality of pieces of divided data. Then, the transmission unit 131 may transmit the plurality of pieces of encrypted data to the mobile bodies 2 equal to or less than the total number included in the two or more proxy mobile bodies 2 so as not to overlap each other.

In this case, in Step S152 (FIG. 6), in a case where it is determined in Step S151 (FIG. 6) that all the electronic signatures attached to the reception completion information received respectively from the two or more proxy mobile bodies 2 are the electronic signatures by the second mobile body 2b, the state information indicating the current state of the second mobile body 2b need only be updated.

The following modifications are applicable to the present disclosure.

(1) In the above-described embodiment, the description has been made of the example in which when the processing unit 232 of the second mobile body 2b determines in Step S245 (FIG. 5) that the second mobile body 2b has no most recent movement plan, the proxy notification request information is transmitted to the first mobile body 2a together with the reception completion information in Step S247 (FIG. 5).

However, instead of this example, as illustrated in FIG. 8, in a case where it is determined in Step S135 in the server device 1 that the delivery data for the second mobile body 2b can be delivered to the first mobile body 2a as a proxy, the processing unit 132 may check whether or not the second mobile body 2b has a most recent movement plan in the same manner as in Step S245 (FIG. 5) (Step S141).

In this case, when it is determined in Step S141 that the second mobile body 2b has no most recent movement plan, the transmission unit 131 transmits, to the first mobile body 2a, the proxy notification request information (information requesting reception of the information indicating completion of reception of the delivery data from the first mobile body and transfer of the information to the computer) together with the proxy download request information (Step S136a). On the other hand, when it is determined in Step S141 that the second mobile body 2b has a most recent movement plan, the transmission unit 131 transmits the proxy download request information to the first mobile body 2a (Step S136).

Then, as illustrated in FIG. 9, in the first mobile body 2a, in a case where the acquisition unit 233 has not acquired the proxy notification request information, when it is detected that the short-range communication with the second mobile body 2b is possible (Step S241), the transmission unit 231 transfers the delivery data for the second mobile body 2b to the second mobile body 2b (Step S242). On the other hand, in a case where the acquisition unit 233 of the first mobile body 2a has acquired the proxy notification request information, when it is detected that the short-range communication with the second mobile body 2b is possible (Step S241), the transmission unit 231 of the first mobile body 2a transmits information requesting transmission of the reception completion information to the second mobile body 2b together with the delivery data for the second mobile body 2b (Step S242a).

In the second mobile body 2b, in a case where the acquisition unit 233 has not acquired the information for requesting transmission of the reception completion information, Steps S246 and S247 are not performed. In this case, in the first mobile body 2a, after the second mobile body 2b departs from the area where the second mobile body 2b is currently staying to other area, Step S252 illustrated in FIG. 6 is not performed. In the server device 1, Steps S151 and S152 are not performed. On the other hand, in the second mobile body 2b, when the acquisition unit 233 has acquired the information requesting transmission of the reception completion information, Steps S246 and S247 are performed after Step S244.

(2) In Step S134 (FIGS. 4 and 8) in the above-described embodiment and the above-described modification (1), in a case where there exists a plurality of mobile bodies 2 planned to move to the uncommunicable area, the plurality of mobile bodies 2 may be determined as proxy mobile bodies 2, and the subsequent processing may be performed.

In this case, when the transmission unit 231 of the second mobile body 2b has already completed the reception of the delivery data from any of the proxy mobile bodies 2, the transmission unit returns information indicating that the transfer of the delivery data is unnecessary to the proxy mobile body 2 immediately after Step S241 (FIGS. 5 and 9). The proxy mobile body 2 that has acquired the information indicating that the transfer of the delivery data is unnecessary does not perform the processing in and after Step S242 (FIGS. 5 and 9).

(3) Steps S146 and S147 (FIG. 5) in the above embodiment may be omitted. Step S141 (FIG. 8) and Step S136a (FIG. 8) in the above-described modification may be omitted. As a result, the proxy mobile body 2 may not transmit the reception completion information to the server device 1 as a proxy for the second mobile body 2b.

(4) In Step S135 (FIGS. 4 and 8) in the above-described embodiment and the above modification, in a case where it is determined that the delivery data for the second mobile body 2b can be delivered to the first mobile body 2a as a proxy, the processing in and after Step S137 (FIGS. 4 and 8) may be performed. As a result, the first mobile body 2a may not automatically transfer the delivery data for the second mobile body 2b to the second mobile body 2b.

In this case, for example, after Step S137 (FIGS. 4 and 8), the transmission unit 131 may transmit a message requesting the user terminal 3 for use by the user of the first mobile body 2a or the administrator terminal 4 to perform an operation of transferring the delivery data after the first mobile body 2a arrives at a movement destination. As a result, the processing of the first mobile body 2a illustrated in FIGS. 5 and 9 may be performed by the operation of the first mobile body 2a by the user or the administrator.

(5) Step S132 (FIGS. 4 and 8) in the above embodiment and the above-described modification may be omitted. With this arrangement, after Step S131 (FIGS. 4 and 8), the delivery data for the second mobile body 2b may be acquired in Step S133 (FIGS. 4 and 8) regardless of whether or not the second mobile body 2b is in the latest state.

INDUSTRIAL APPLICABILITY

According to the present disclosure, delivery data for a mobile body in a state of being incapable of wireless communication can be delivered, which is useful for providing sharing service of sharing a plurality of mobile bodies.

The invention claimed is:

1. A control method comprising, by a computer:
   acquiring schedule information indicating movement plans of a plurality of mobile bodies to be shared in a sharing service, the plurality of mobile bodies being capable of short-range wireless communication with each other;
   when detecting that state information indicating a current state of a first mobile body among the plurality of mobile bodies is unable to be received from the first mobile body, searching for a second mobile body planned to move to a first area where the first mobile body is staying based on the schedule information; and transmitting delivery data for the first mobile body to the second mobile body.

2. The control method according to claim 1, wherein the schedule information includes information indicating an area from which and a date and time when the plurality of mobile bodies are planned to depart, and information indicating an area at which and a date and time when the plurality of mobile bodies are planned to arrive.

3. The control method according to claim 1, wherein the delivery data is data that brings the first mobile body into a latest state, and the transmission of the delivery data includes:

transmitting the delivery data to the second mobile body when it is detected that the state information received most recently from the first mobile body fails to indicate a latest state of the first mobile body.

4. The control method according to claim 1, wherein the transmission of the delivery data further includes:

transmitting, to the second mobile body, information requesting transfer of the delivery data to the first mobile body.

5. The control method according to claim 4, wherein the transmission of the delivery data further includes:

when it is detected that the first mobile body stays in the first area for a predetermined time or more based on the schedule information, further transmitting, to the second mobile body, information requesting to receive information indicating completion of reception of the delivery data from the first mobile body and transfer the information to the computer.

6. The control method according to claim 1, wherein the search for the second mobile body includes:

calculating a required time required to complete transfer of the delivery data to the first mobile body based on a speed of communication with the first mobile body by the short-range wireless communication and on a data amount of the delivery data; and searching for one or more mobile bodies whose stay times in the first area are longer than the required time as the second mobile body based on the schedule information.

7. The control method according to claim 6, wherein the search for the second mobile body includes:

when two or more mobile bodies whose stay times in the first area are longer than the required time are detected based on the schedule information, searching for, as the second mobile body, a mobile body that first moves from the first area to a second area different from the first area among the two or more mobile bodies based on the schedule information.

8. The control method according to claim 1, wherein the search for the second mobile body includes:

calculating a required time required to complete transfer of the delivery data to the first mobile body based on a speed of communication with the first mobile body by the short-range wireless communication and on a data amount of the delivery data; and searching for two or more mobile bodies whose stay times in the first area are shorter than the required time as the second mobile body based on the schedule information, and the transmission of the delivery data includes:

dividing the delivery data into a plurality of pieces of data equal to or less than a total number of the second mobile bodies, and transmitting the plurality of pieces of data to the mobile bodies equal to or less than the total number included in the second mobile bodies so as not to overlap each other.

9. A server device comprising:

a processor, in cooperation with a memory, performs operations including:

acquiring schedule information indicating movement plans of a plurality of mobile bodies to be shared in a sharing service, the plurality of mobile bodies being capable of short-range wireless communication with each other;

when detecting that state information indicating a current state of a first mobile body among the plurality of mobile bodies is unable to be received from the first mobile body, searching for a second mobile body planned to move to a first area where the first mobile body is staying based on the schedule information; and transmitting delivery data for the first mobile body to the second mobile body.

10. A non-transitory computer readable storage medium storing a program that causes a computer to execute functions of:

acquiring schedule information indicating movement plans of a plurality of mobile bodies to be shared in a sharing service, the plurality of mobile bodies being capable of short-range wireless communication with each other;

when detecting that state information indicating a current state of a first mobile body among the plurality of mobile bodies is unable to be received from the first mobile body, searching for a second mobile body planned to move to a first area where the first mobile body is staying based on the schedule information; and transmitting delivery data for the first mobile body to the second mobile body.

11. A data delivery system that transmits data from a server device to a plurality of mobile bodies to be shared in a sharing service, wherein each of the plurality of mobile bodies includes:

a processor, in cooperation with a memory, performs operations including:

transmitting state information indicating a current state of the mobile body to the server device; and performing, using a short-range wireless communication circuit, short-range wireless communication with other mobile body, and the server device includes:

a processor, in cooperation with a memory, performs operations including:

acquiring schedule information indicating movement plans of the plurality of mobile bodies;

when detecting that the state information is unable to be received from a first mobile body among the plurality of mobile bodies, searching for a second mobile body planned to move to a first area where the first mobile body is staying based on the schedule information; and transmitting delivery data for the first mobile body to the second mobile body.

* * * * *